United States Patent
Sugimoto et al.

(10) Patent No.: US 7,486,010 B2
(45) Date of Patent: Feb. 3, 2009

(54) PLASMA DISPLAY DEVICE AND METHOD OF PREPARING PHOSPHOR

(75) Inventors: Kazuhiko Sugimoto, Kyoto (JP); Junichi Hibino, Kyoto (JP); Masaki Aoki, Osaka (JP); Yoshinori Tanaka, Osaka (JP); Hiroshi Setoguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 511 days.

(21) Appl. No.: 10/517,262

(22) PCT Filed: Feb. 18, 2004

(86) PCT No.: PCT/JP2004/001761

§ 371 (c)(1),
(2), (4) Date: Dec. 7, 2004

(87) PCT Pub. No.: WO2004/075237

PCT Pub. Date: Sep. 2, 2004

(65) Prior Publication Data

US 2005/0225520 A1    Oct. 13, 2005

(30) Foreign Application Priority Data

Feb. 20, 2003    (JP)    ............. 2003-042864

(51) Int. Cl.
  C09K 11/08    (2006.01)
  C09K 11/64    (2006.01)
  H01J 17/49    (2006.01)
(52) U.S. Cl. ............... 313/486; 313/582; 252/301.4 R
(58) Field of Classification Search ......... 313/582–587, 313/486; 252/301.4 R
See application file for complete search history.

(56) References Cited

U.S. PATENT DOCUMENTS

| 6,960,309 | B2 * | 11/2005 | Aoki et al. | 252/301.4 R |
| 7,014,792 | B2 * | 3/2006 | Raukas et al. | 252/301.4 R |
| 2002/0039665 | A1 * | 4/2002 | Do et al. | 428/690 |
| 2003/0094596 | A1 * | 5/2003 | Kijima et al. | 252/301.4 R |

FOREIGN PATENT DOCUMENTS

| JP | 08115673 | A | * | 5/1996 |
| JP | 2000-290649 | | | 10/2000 |
| JP | 2002-110050 | | | 4/2002 |
| JP | 2002-334656 | | | 11/2002 |
| JP | 2003-336055 | | | 11/2003 |
| JP | 2003336055 | A | * | 11/2003 |

OTHER PUBLICATIONS

"Phosphor Handbook" edited by Society of Phosphor, p. 170. (with partial English translation).

* cited by examiner

*Primary Examiner*—Karabi Guharay
(74) *Attorney, Agent, or Firm*—Wenderoth, Lind & Ponack, L.L.P.

(57) ABSTRACT

In a phosphor whose host crystal is constituted of an oxide, a method of preparing the phosphor where the oxygen deficiencies in the phosphor are not many, and a plasma display device using the same are provided. After processes of weighing, mixing and filling powders of the phosphor, a process for firing in a reducing atmosphere and a process for firing in an oxidizing atmosphere after the last reducing atmosphere process are provided. In addition, a firing temperature in the oxidizing atmosphere process is not less than 600° C. and not more than 1000° C.

1 Claim, 2 Drawing Sheets

PLASMA DISPLAY DEVICE AND METHOD OF PREPARING PHOSPHOR

THIS APPLICATION IS A U.S. NATIONAL PHASE APPLICATION OF PCT INTERNATIONAL APPLICATION PCT/JP2004/001761.

TECHNICAL FIELD

The present invention relates to a plasma display device and a method of preparing a phosphor. In particular, the phosphor can be used well for a display device (e.g., a plasma display device) or an illuminator (e.g., a rare gas discharge lamp or a high load fluorescent lamp).

BACKGROUND ART

Recently, among color display devices used as image devices of computers or televisions, a plasma display device has drawn attention as a color display device which can realize a thin, light and large display.

Three primary colors (a red, green and blue) are added by an additive process, so that the plasma display device performs a full color display. For performing the full color display, the plasma display device has phosphor layers for emitting red, green and blue light which are three primary colors. In a discharge cell of the plasma display device, ultraviolet rays having a frequency of 200 nm are generated by discharge of rare gas. Then each phosphor is excited by the ultraviolet ray, whereby each visible light is generated.

As the phosphor for emitting light discussed above, for example, $(Y, Gd)BO_3:Eu^{3+}$, $Y_2O_3:Eu^{3+}$ are known for emitting red light. $(Ba, Sr, Mg)O \cdot aAl_2O_3:Mn^{2+}$, $Zn_2SiO_4:Mn^{2+}$ are known for emitting green light. $BaMgAl_{10}O_{17}:Eu^{2+}$ is known for emitting blue light.

In the blue phosphor whose parent body is $BaMgAl_{10}O_{17}$ and called BAM base, Eu of an emission center is required to be activated at divalence to intensify brightness of emission. An example for firing in a reducing atmosphere is disclosed at page 170 of "Phosphor Handbook" edited by Phosphor Research Society and published by Ohmsha, Ltd.

When the phosphor is fired in an oxidizing atmosphere, Eu becomes trivalent and can not correctly replace divalent Ba in the parent body. Therefore, Eu can not be an active emission center, so that brightness of emission decreases. Furthermore, the blue phosphor does not perform its purpose and generates red emission of $Eu^{3+}$ its own.

Europium activated acid yttrium sulfide $(Y_2O_2S:Eu^{3+})$ of a red phosphor is required to be activated at trivalence, so that it is produced by firing in an oxidizing atmosphere. In a phosphor whose host crystal is constituted of an oxide, it is commonly thought that oxygen atoms are removed from the host crystal in firing, so that oxygen deficiencies are generated. As a method for repairing the oxygen deficiencies, an example for firing $Y_2O_2S:Eu^{3+}$ where Eu is activated at trivalence by inert gas containing oxygen is disclosed in Japanese Patent Unexamined Publication No. 2000-290649.

However, as compared with a phosphor oxide produced by firing in an oxidizing atmosphere, in a phosphor oxide produced by firing in a reducing atmosphere, an oxide is easy to be removed from the host crystal in the reducing atmosphere, so that oxygen deficiencies in the host crystal increase. In addition, if a phosphor oxide, which has to be fired in a reducing atmosphere, is fired in an oxidizing atmosphere, it is difficult to maintain the original number of valence of an activator.

In other words, when ion impact accompanied by discharge or irradiation of ultraviolet rays is applied to the phosphor whose host crystal has many oxygen deficiencies, the phosphor tends to deteriorate with time, where the ultraviolet rays having high energy and 147 nm frequency are generated at the plasma display device. It is thought that bonding between atoms is weak at a place where oxygen deficiencies exist. Therefore, when ultraviolet rays of high energy or ion impact are applied to such a place, a crystal structure falls into disorder and the place tends to be amorphous. The amorphous place means deterioration of the host crystal, so that deterioration of brightness with time, color shift by chromaticity variation, image burn-in or the like is generated in the plasma display device.

If a phosphor oxide, which has to be fired in a reducing atmosphere, is fired in an oxidizing atmosphere to repair the oxygen deficiencies, for example, Eu becomes trivalent $Eu^{3+}$ in BAM base phosphor, so that conspicuous deterioration of brightness is generated.

The present invention is directed to solve the problem discussed above, and aims to provide a method of preparing a phosphor which can repair oxygen deficiencies without deterioration of emission brightness and a plasma display device with a phosphor having high emission brightness and slight deterioration of brightness, even in the phosphor whose host crystal is an oxide and Eu or Mn of an emission center is required to be activated at divalence.

SUMMARY OF THE INVENTION

A plasma display device includes the following elements:
a plurality of discharge cells, which show a single color or multiple colors, being arranged; and
phosphor layers corresponding to the discharge cells being disposed and excited by ultraviolet rays for emitting light,
where a composition formula of at least one phosphor layer of the phosphor layers is $Ba_{(1-x-y)}Sr_yMgAl_{10}O_{17}:Eu_x$, and the phosphor layer is formed of a phosphor which has been heat-treated in an oxidizing atmosphere.

According to the plasma display device of this invention, the high quality plasma display device whose deterioration of brightness is not much can be realized.

DETAILED DESCRIPTION OF THE PREFERRED EMBODIMENT

The exemplary embodiment of the present invention is demonstrated hereinafter with reference to the accompanying drawings.

Figure 1:
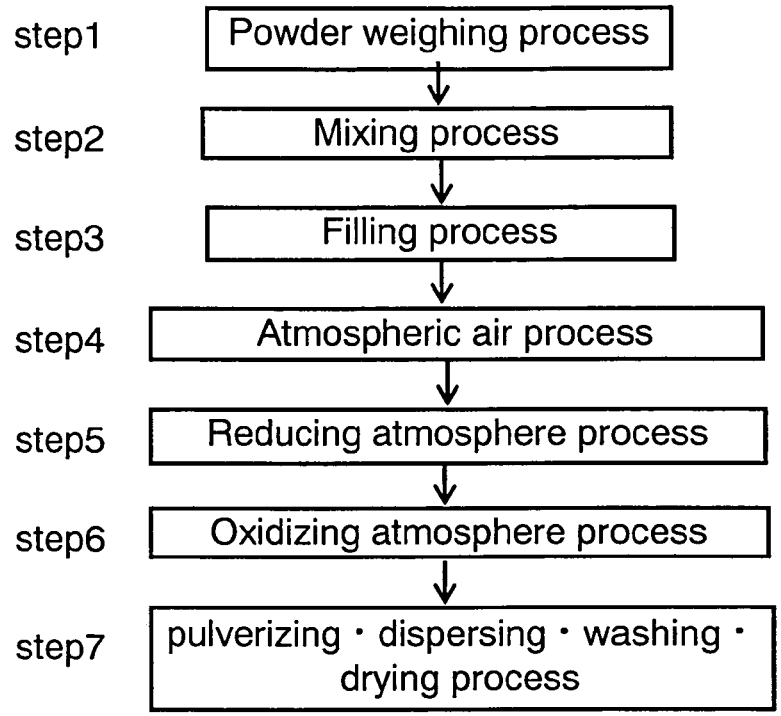
FIG. 1 is a flow chart showing a method of preparing a phosphor in accordance with an exemplary embodiment of the present invention.

FIG. 1 is a flow chart showing a method of preparing a phosphor in accordance with the exemplary embodiment of the present invention. A composition of BaSrMgAl$_{10}$O$_{17}$:Eu, which is a kind of phosphor aluminate, is described hereinafter as an example.

In a powder weighing process of step 1, the following materials such as carbonates, oxides or hydroxides, are generally weighed as materials of metals. A barium compound such as a barium carbonate, a barium hydroxide, a barium oxide or a barium nitrate is used as a raw material of barium. A strontium compound such as a strontium carbonate, a strontium hydroxide or a strontium nitrate is used as a raw material of strontium. A magnesium compound such as a magnesium carbonate, a magnesium hydroxide, a magnesium oxide or a magnesium nitrate is used as a raw material of magnesium. An aluminum compound such as an aluminum oxide, an aluminum hydroxide or an aluminum nitrate is used as a raw material of aluminum. A europium compound such as a europium oxide, a europium carbonate, a europium hydroxide or a europium nitrate is used as a raw material of europium.

These materials are weighed so as to be a certain mole ratio of constitute ions. A calcium compound such as a calcium hydroxide, a calcium carbonate or a calcium nitrate is used as a raw material of calcium.

In a mixing process of step 2, if necessary, a flux of a crystal growth accelerator such as an aluminum fluoride, a barium fluoride or a magnesium fluoride is added to the weighed raw material discussed above. For example, a ball mill is used as a mixing method, and the material is mixed for approximately one to five hours. In addition, a coprecipitation process or a method for mixing a law material, which is an alkoxide changed from a metal, in a liquid phase can be used.

In a filling process of step 3, the mixture produced above is filled into a heat-proof melting pot such as a high-purity alumina melting pot.

In an atmospheric air process of step 4, for accelerating crystal growth of a host crystal, the filled mixed powder is fired in an atmospheric air at not less than 800° C. and not more than 1500° C. for 1 hour to 10 hours. The step 4 is not essential because it aims to accelerate crystal growth.

In a reducing atmosphere process of step 5, the mixture is fired in a reducing atmosphere at a temperature at which a desired crystal structure can be formed at a mixed atmosphere of hydrogen and nitrogen without oxygen. A phosphor aluminate of the present embodiment is fired at not less than 1100° C. and not more than 1500° C. for 1 hour to 50 hours. In the reducing atmosphere, when an oxide including phosphorus elements of the fifth family of a periodic table or sulfur elements of the sixth family which can bond many oxygen atoms is mixed to the phosphor and fired, oxygen deficiencies can be efficiency repaired in a next oxidizing atmosphere process.

In the oxidizing atmosphere process of step 6, the mixture is fired in an oxidizing atmosphere at not less than 600° C. and not more than 1000° C. The phosphor aluminate of the present embodiment is fired in the oxidizing atmosphere for 1 hour to 50 hours. The oxidizing atmosphere is higher than the reducing atmosphere mentioned above in oxygen partial pressure.

If the firing temperature is less than 600° C. in the oxidizing atmosphere, the temperature is not sufficient for the oxygen to enter for repairing oxygen deficiencies, whereby oxygen deficiencies are not repaired. If the firing temperature is more than 1000° C., trivalent Eu ions increase and divalent Eu ions decrease more than necessary, so that sufficient emission can not be obtained.

In a pulverizing, dispersing, washing and drying processes of step 7, the mixed powder fired in the oxidizing atmosphere is sufficiently cooled. Then the mixed powder is pulverized, dispersed and washed in a wet process by using a bead mill or the like as a dispersing means for approximately one hour. An apparatus for pulverizing or dispersing the fired material is not limited to the bead mill, and other dispersing apparatuses such as a ball mill or a jet mill may be used. After that, the powder of the phosphor, which has been pulverized, dispersed and washed, is dehydrated and dried sufficiently. Then it is passed through a sieve.

According to the present embodiment, the reducing atmosphere process and the oxidizing atmosphere process are each executed at one time. However, the reducing atmosphere process for intensifying brightness of emission by making Eu divalent and the oxidizing atmosphere process for repairing the oxygen deficiencies of the host crystal may be repeated at a plurality of times. In addition, the atmospheric air process may be executed before the reducing atmosphere process at one or more times. Furthermore, the powder may be pulverized, dispersed and washed after each process.

Figure 2:
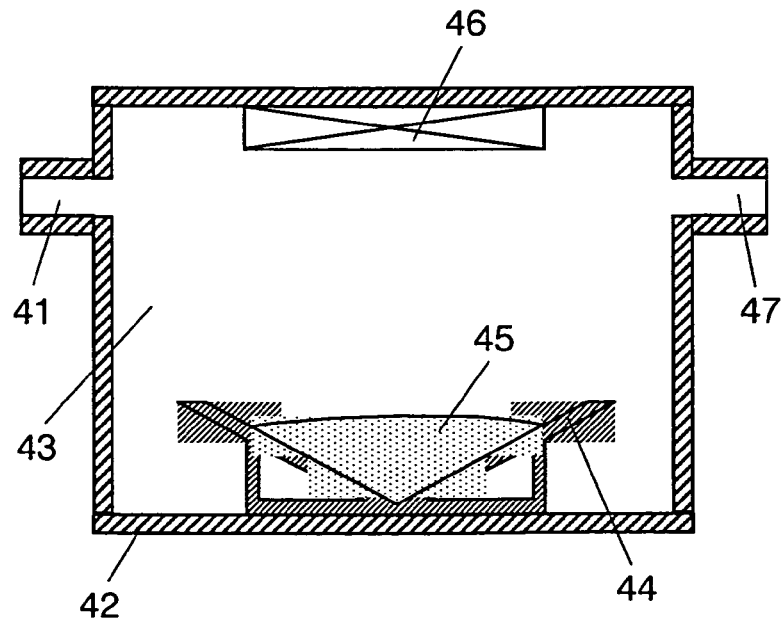
FIG. 2 is a sectional view of a heat-treat apparatus in an oxidizing atmosphere process in accordance with the exemplary embodiment of the present invention.

FIG. 2 is a sectional view of a heat-treat apparatus in the oxidizing atmosphere process in accordance with the exemplary embodiment of the present invention. Introduction gas controlled at a certain oxygen concentration is guided through inlet 41 into chamber 42, thereby forming oxidizing atmosphere 43. At oxidizing atmosphere 43 of an ordinary pressure, phosphor powder 45 in alumina melting pot 44 is fired at not less than 600° C. and not more than 1000° C. for 1 hour to 5 hours, whereby the oxygen deficiencies of the host crystal can be repaired. Heating means 46 is formed of a coil for heating or an infrared lamp. Gas forming oxidizing atmosphere 43 is ejected from outlet 47.

An example of characteristics that phosphor aluminate Ba$_{(1-x-y)}$ Sr$_y$ MgAl$_{10}$O$_{17}$:Eu$_x$ is produced at the oxidizing atmosphere process after the reducing atmosphere process are described hereinafter.

First Exemplary Embodiment

Well-dried powders of barium carbonate (BaCo$_3$), magnesium carbonate (MgCo$_3$), europium oxide (Eu$_2$O$_3$) and aluminum oxide (Al$_2$O$_3$) are prepared. These materials are weighed so as to be Ba:Mg:Eu:Al=0.99:1.00:0.01:10.00 as a mole ratio of constitute ions. Aluminium fluoride as a crystal growth accelerator is added to the weighed material mentioned above and mixed by using a ball mill for 3 hours.

Next, this mixture is filled into a high-purity alumina melting pot, and fired in an atmospheric air at 1200° C. for 1 hour. After that, in a reducing atmosphere process, the fired mixed powder is fired at 1200° C. for 10 hours in a reducing atmosphere at which the ratio of nitrogen to hydrogen is 20% to 80% in a partial pressure. Furthermore, in an oxidizing atmosphere process, it is fired at 800° C. for 3 hours in an oxidizing atmosphere at which the ratio of oxygen to nitrogen is 20% to 80% in a partial pressure.

After the fired powder is sufficiently cooled, it is pulverized, dispersed and washed in a wet process by using a bead mill for approximately one hour. The mixed powder of the phosphor, which has been washed, is dehydrated and sufficiently dried. Then it is passed through a sieve, so that the mixed powder of the phosphor whose general formula is Ba$_{0.99}$MgAl$_{10}$O$_{17}$:Eu$_{0.01}$ is produced.

Next, a vacuum ultraviolet ray of 146 nm wavelength from a vacuum-ultraviolet-excimer-irradiation apparatus (146 nm-light-irradiation device produced by Ushio Inc.) is irradiated to the produced phosphor powder. Then, brightness for an irradiation time is measured by a luminance meter (LS-110 produced by Minolta Camera Co., Ltd.). A relative brightness value, which is a characteristic value of brightness and defined hereinafter, is used as a performance index. The relative brightness is defined as multiplying relative-initial-emission intensity of the phosphor by a brightness maintenance ratio. The relative-initial-emission intensity denotes a ratio of initial emission intensity of a material in the present embodiments to that of the conventional material in a case where the initial emission intensity of the conventional material is regarded as 100. The brightness maintenance ratio is a percentage value defined as dividing brightness of a material in the present embodiments by initial emission intensity of the material in the present embodiments. In a word, the relative brightness value is defined as comparing a conventional phosphor with a phosphor of the present embodiments in brightness of a phosphor after a certain time. Table 1 denotes composition ratios of materials, process conditions and relative brightness values.

Second and Third Exemplary Embodiments

The identical materials used in the first embodiment are weighed so as to be Ba:Mg:Eu:Al=0.9:1.0:0.1:10.0 in the second embodiment, and Ba:Mg:Eu:Al=0.8:1.0:0.2:10.0 in the third embodiment as a mole ratio of constitute ions. The second and third embodiments differ from the first embodiment in the following points. In the second embodiment, the material is fired in an atmospheric air at 1400° C. for 1 hour, and fired in a reducing atmosphere at which a ratio of nitrogen to hydrogen is 95% to 5% in a partial pressure at 1100° C. for 10 hours. On the other hand, in the third embodiment, the material is fired in an atmospheric air at 800° C. for 1 hour, and fired in a reducing atmosphere at which nitrogen is 100% in a partial pressure at 1200° C. for 10 hours. Then the phosphor powders produced in the condition mentioned above are evaluated by the relative brightness value in the same manner as the first embodiment. Table 1 denotes process conditions, relative brightness values and the like.

Fourth to Ninth Exemplary Embodiments

In the fourth embodiment, powder of strontium carbonate ($SrCO_3$) is added to the materials used in the first embodiment so as to be Ba:Sr:Mg:Eu:Al=0.89:0.10:1.00:0.01:10.0 as a mole ratio of constitute ions. In the fifth embodiment, a mole ratio of constitute ions is set as Ba:Sr:Mg:Eu:Al=0.8:0.1:1.0:0.1:10.0. In the sixth embodiment, a mole ratio of constitute ions is set as Ba:Sr:Mg:Eu:Al=0.7:0.1:1.0:0.2:10.0. In the seventh embodiment, a mole ratio of constitute ions is set as Ba:Sr:Mg:Eu:Al=0.69:0.30:1.00:0.01:10.00. In the eighth embodiment, a mole ratio of constitute ions is set as Ba:Sr:Mg:Eu:Al=0.6:0.3:1.0:0.1:10.0. In the ninth embodiment, a mole ratio of constitute ions is set as Ba:Sr:Mg:Eu:Al=0.5:0.3:1.0:0.2:10.0. The fourth and ninth embodiments differ from the first embodiment in the following points. In the fourth embodiment, the material is not fired in an atmospheric air, and fired in a reducing atmosphere at which a ratio of hydrogen is 100% in a partial pressure at 100° C. for 10 hours. In the fifth embodiment, the material is fired in an atmospheric air at 1300° C. for 1 hour, and fired in a reducing atmosphere at which a ratio of nitrogen to hydrogen is 99% to 1% in a partial pressure at 1200° C. for 10 hours. In the sixth embodiment, the material is fired in an atmospheric air at 1400° C. for 1 hour, and fired in a reducing atmosphere at which a ratio of nitrogen to hydrogen is 90% to 10% in a partial pressure at 1400° C. for 10 hours. In the seventh embodiment, the material is fired in an atmospheric air at 1300° C. for 1 hour, and fired in a reducing atmosphere at which a ratio of nitrogen to hydrogen is 98% to 2% in a partial pressure at 1300° C. for 10 hours. In the eighth embodiment, the material is fired in an atmospheric air at 1000° C. for 1 hour, and fired in a reducing atmosphere at which a ratio of nitrogen to hydrogen is 90% to 10% in a partial pressure at 1300° C. for 10 hours. In the ninth embodiment, the material is fired in an atmospheric air at 1200° C. for 1 hour, and fired in a reducing atmosphere at which a ratio of nitrogen to hydrogen is 50% to 50% in a partial pressure at 1300° C. for 10 hours. Then the phosphor powders produced in the condition discussed above are evaluated by the relative brightness value in the same manner as the first embodiment. Table 1 denotes process conditions, relative brightness values and the like.

Comparative Example

In the comparative example, the phosphor having the same mole ratio of constitute ions in the fifth embodiment is produced by the conventional method. The comparative example differs from the fifth embodiment in that it does not have the oxidizing atmosphere process for repairing oxygen deficiencies. A brightness maintenance ratio of this material is 69%, so that its relative brightness value is 69.

TABLE 1

| | mole ratio of constitute ions | | | general formula | atmospheric air temperature | reducing atmosphere temperature H$_2$ concentration | oxidizing atmosphere temperature O$_2$ concentration | relative brightness value |
|---|---|---|---|---|---|---|---|---|
| | Ba | Sr | Eu | | | | | |
| embodiment 1 | 0.99 | 0 | 0.01 | Ba$_{0.99}$MgAl$_{10}$O$_{17}$:Eu$_{0.01}$ | 1200° C. | 1200° C. 80% | 800° C. 20% | 71 |
| embodiment 2 | 0.9 | 0 | 0.1 | Ba$_{0.9}$MgAl$_{10}$O$_{17}$:Eu$_{0.1}$ | 1400 | 1100 5 | | 90 |
| embodiment 3 | 0.8 | 0 | 0.2 | Ba$_{0.8}$MgAl$_{10}$O$_{17}$:Eu$_{0.2}$ | 800 | 1200 0 | | 84 |
| embodiment 4 | 0.89 | 0.1 | 0.01 | Ba$_{0.89}$Sr$_{0.1}$MgAl$_{10}$O$_{17}$:Eu$_{0.01}$ | — | 1100 100 | | 71 |
| embodiment 5 | 0.8 | 0.1 | 0.1 | Ba$_{0.8}$Sr$_{0.1}$MgAl$_{10}$O$_{17}$:Eu$_{0.1}$ | 1300 | 1200 1 | | 88 |
| embodiment 6 | 0.7 | 0.1 | 0.2 | Ba$_{0.7}$Sr$_{0.1}$MgAl$_{10}$O$_{17}$:Eu$_{0.2}$ | 1400 | 1400 10 | | 90 |

TABLE 1-continued

| | mole ratio of constitute ions | | general formula | atmospheric air temperature | reducing atmosphere temperature H$_2$ concentration | oxidizing atmosphere temperature O$_2$ concentration | relative brightness value |
|---|---|---|---|---|---|---|---|
| | Ba | Sr | Eu | | | | | |
| embodiment 7 | 0.69 | 0.3 | 0.01 | Ba$_{0.69}$Sr$_{0.3}$MgAl$_{10}$O$_{17}$:Eu$_{0.01}$ | 1300 | 1300 2 | | 74 |
| embodiment 8 | 0.6 | 0.3 | 0.1 | Ba$_{0.6}$Sr$_{0.3}$MgAl$_{10}$O$_{17}$:Eu$_{0.1}$ | 1000 | 1300 10 | | 84 |
| embodiment 9 | 0.5 | 0.3 | 0.2 | Ba$_{0.5}$Sr$_{0.3}$MgAl$_{10}$O$_{17}$:Eu$_{0.2}$ | 1200 | 1300 50 | | 71 |
| comparative example | 0.8 | 0.1 | 0.1 | Ba$_{0.8}$Sr$_{0.1}$MgAl$_{10}$O$_{17}$:Eu$_{0.1}$ | 1300 | 1200 1 | — | 69 |

As shown in Table 1, at $0.01 \leq x \leq 0.20$, $0 \leq y \leq 0.30$, the relative brightness value of phosphor aluminate of Ba$_{(1-x-y)}$Sr$_y$MgAl$_{10}$O$_{17}$:Eu$_X$ increases by 11 on average as compared with that of the comparative example, so that luminance of emission becomes higher. A notable effect can be obtained by setting values of "x" and "y" (i.e., an amount of Ba, Sr and Eu of phosphor aluminate Ba$_{(1-x-y)}$ Sr$_y$ MgAl$_{10}$O$_{17}$:Eu$_x$ mentioned above) within the range discussed above. However, with regard to an amount of Mg or Al, if an amount of mole of Mg or Al (i.e., Mg is 1, Al is 10) ranges approximately within ±5%, an effect of improvement of luminous efficiency does not change.

According to the first to ninth embodiments, a firing condition in the reducing atmosphere for producing the material or a firing condition in the atmospheric air before the reducing atmosphere process is variously changed. However, it is thought that presence or absence of firing in the oxidizing atmosphere affect the relative brightness value more than these conditions. In particular, the fifth embodiment differs from the comparative example in the relative brightness value by 19. In a case where the fifth embodiment is compared with the comparative example, a mole ratio of constitute ions is the same, and only presence or absence of the oxidizing atmosphere process for repairing the oxygen deficiencies is different. In addition, an effect of firing in the oxidizing atmosphere is estimated as follows:

First, Eu is generally used well as an activator which can become divalent or trivalent. However, in an example of a BAM base of a blue phosphor, it is required that a stable emission center Eu$^{2+}$ is produced by replacing a divalent Eu to a divalent Ba while a parent body of Ba$_{(1-x)}$MgAl$_{10}$O$_{17}$ is generated from its raw material. To serve this purpose, the material can be fired at high temperature 1000° C.-1500° C. for not less than 4 hours in an appropriate reducing atmosphere as a conventional basic firing method.

Second, with regard to repairing the oxygen deficiencies of the host crystal which is generated in the reducing atmosphere mentioned above, in a case where the material is fired for not less than 1 hour in the oxidizing atmosphere at which the ratio of oxygen to nitrogen is 20% to 80% in a partial pressure, if the firing temperature is not less than 600° C., an effect of repairing the oxygen deficiencies can be observed. Furthermore, when the firing temperature is not less than 750° C., the greater effect can be observed. The change of activator Eu from divalence to trivalence accompanied by firing for repairing the oxygen deficiencies in the oxidizing atmosphere is little observed at less than 850° C., however, the change increases significantly at more than 1000° C. In this case, BAM:Eu phosphor has been measured for evaluating the change by generation of a red emission of Eu$^{3+}$ its own as an index of performance. The reason that valence change of Eu does not appear at not more than 1000° C. is described hereinafter. For replacing divalent Ba in BAM and changing divalent Eu, which is stably existed, into trivalent Eu, it is necessary to produce vacancies, which surround Eu in the host crystal, for electric charge compensation. In that case, atom movement in the host crystal is accompanied, so that a high temperature more than 1000° C., which is suitable for a crystal growth, is required. As a result, when the oxygen deficiencies in the host crystal are repaired in the oxidizing atmosphere, in a case where the firing temperature is not less than 600° C. and not more than 1000° C., more preferably not less than 750° C. and not more than 850° C., stable divalent Eu of BAM:Eu generated in the reducing atmosphere is not changed into trivalent. Therefore, stable phosphor oxide which can repair the oxygen deficiencies can be obtained.

Sr is not necessary for the composition of the phosphor, however, when Sr is included, a part of Ba$^{2+}$ replaces Sr$^{2+}$ having a smaller ionic radius. As a result, a lattice constant of the crystal structure is reduced a little, so that a luminescent color of the blue phosphor can be brought to a more desirable color.

Figure 3:
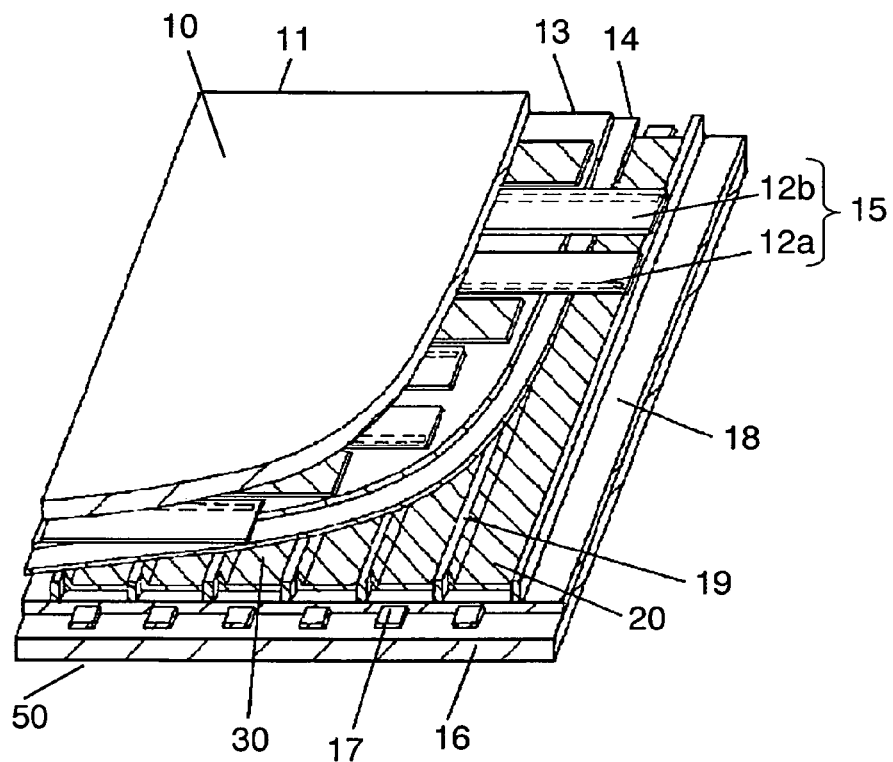
FIG. 3 is a perspective view of an essential part of a plasma display device in accordance with the exemplary embodiment of the present invention.

FIG. 3 is a perspective view of an essential part of a plasma display device in accordance with the exemplary embodiment of the present invention. Display electrode 15, which is formed of scan electrode 12a and sustain electrode 12b, is disposed on transparent and insulating front substrate 11. Dielectric layer 13 covers display electrodes 15, and protective layer 14 is formed on dielectric layer 13, so that front board 10 is constructed.

A prescribed number of display electrodes 15 having a certain pitch are formed on front substrate 11. Dielectric layer 13 is formed after forming display electrodes 15 and required to cover display electrodes 15, so that it is generally formed by printing and firing low-melting glass. Low-melting glass paste including lead oxide (PbO), silicon oxide (SiO$_2$), boron oxide (B$_2$O$_3$), zinc oxide (ZnO), barium oxide (BaO) or the like (i.e., PbO—SiO$_2$—B$_2$O$_3$—ZnO—BaO base glass composition) can be used as glass paste material. Dielectric layer 13 having a prescribed thickness can be easily obtained by, for example, repeating screen printing and firing using this glass paste. This thickness can be set in response to a thickness of display electrode 15 or a target of electrostatic capacity.

According to the present embodiment, the thickness of dielectric layer 13 is approximately 40 μm. Besides, glass paste whose principal component is at least one of lead oxide (PbO), bismuth oxide ($Bi_2O_3$) and phosphorus oxide ($PO_4$) may be used. Protective layer 14 is formed so that dielectric layer 13 is not sputtered by plasma discharge. Therefore, a superior material for sputtering resistance is required, and thus magnesium oxide (MgO) is generally used.

On transparent and insulating rear substrate 16, data electrodes 17 for addressing image data are formed so as to cross over display electrodes 15 of front board 10 at right angles. Insulating layer 18 is formed on rear substrate 16 so as to cover data electrodes 17. Barrier ribs 19 parallel to data electrodes 17 are formed substantially at a center between data electrodes 17. Phosphor layers 20 are formed at areas surrounded by barrier ribs 19, so that rear board 50 is constructed. Phosphor layer 20 is formed of a phosphor for emitting red light, a phosphor for emitting green light and a phosphor for emitting blue light which are adjacent one another, so that a pixel is constructed.

Data electrode 17 is formed of single layer film such as a low-resistance silver, aluminum or copper, or a laminated film (e.g., a two layer film formed of chrome and copper, or a three layer film formed of chrome, copper and chrome) using a thin film producing technology such as a printing, firing or sputtering method. Insulating layer 18 may be formed of the identical material and method with dielectric layer 13. Besides, glass paste whose principal component is at least one of lead oxide (PbO), bismuth oxide ($Bi_2O_3$) and phosphorus oxide ($PO_4$) may be used. Using the preparing method discussed above, phosphors for emitting red light, phosphors for emitting green light and phosphors for emitting blue light are applied to the areas, which are surrounded by barrier ribs 19, by using a ink jet method for example, so that phosphor layers 20 are formed.

When front board 10 and rear board 50 are confronted with each other, discharge space 30 surrounded by barrier rib 19, protective layer 14 on front substrate 11 and phosphor layers 20 on rear substrate 16 is formed. Discharge space 30 is filled with mixed gas of Ne and Xe at a pressure of approximately 66.5 kPa, and an alternating voltage of several tens-hundred of kHz is applied between scan electrode 12a and sustain electrode 12b for discharge. Then phosphor layer 20 can be excited by ultraviolet rays generated at a moment when an excited Xe atom returns to a ground state. By this excitation, phosphor layer 20 emits red light, green light or blue light corresponding to the applied material. Accordingly, when a pixel and a color to be lightened are selected by data electrode 17, a required color can be displayed at a prescribed pixel, whereby a color image can be displayed.

Figure 4:
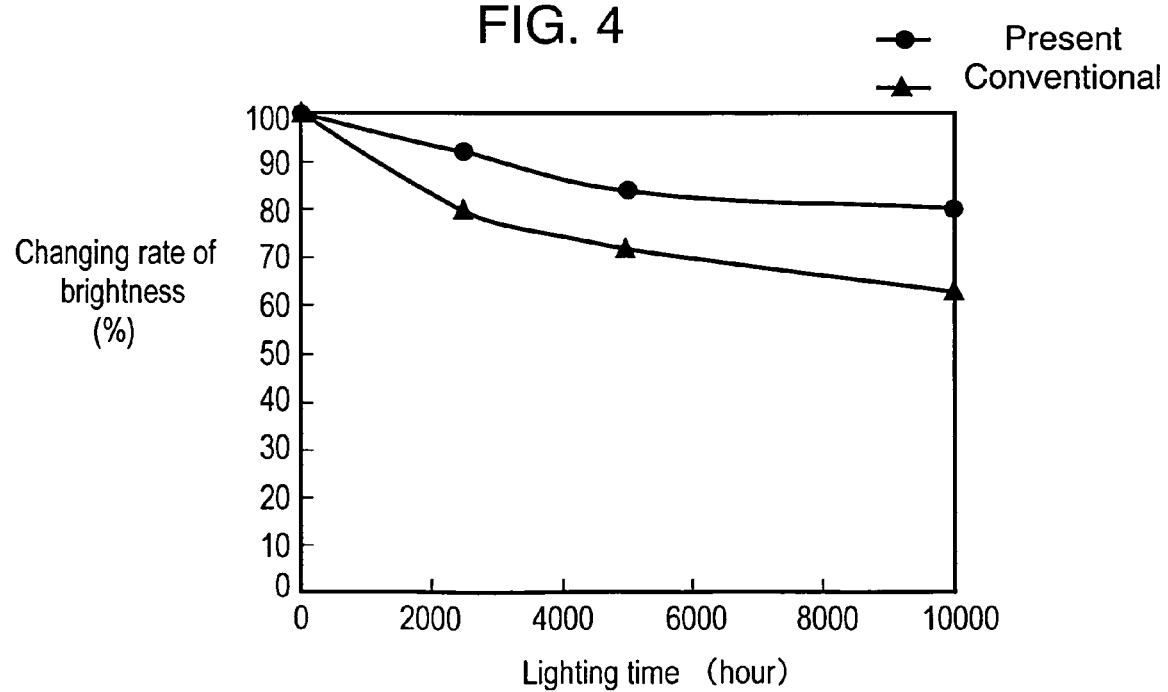
FIG. 4 shows a characteristic of a changing rate of brightness of the phosphor used in the plasma display device in accordance with the exemplary embodiment of the present invention.

FIG. 4 shows a characteristic of a changing rate of brightness of the phosphor used in the plasma display device discussed above. Time variations of brightness of the phosphor of the fifth embodiment manufactured by the present method and the phosphor of the comparative example manufactured by the conventional method are measured by applying a pulse voltage of 180 V amplitude and 15 kHz wavelength between display electrodes 15. Brightness of emission at initial lighting is defined as 100%, and the changing rate of brightness is defined by dividing brightness of emission at each lighting time by the brightness of emission at the initial lighting. After 5000 hours of lighting, the changing rate of brightness of phosphor manufactured by the conventional method decreases 72%. On the contrary, the changing rate of brightness of phosphor manufactured by the present method maintains 84%. In a word, the present embodiment improves the changing rate of brightness by 12%, and deterioration of brightness is restricted. Because the phosphor manufactured by the present method is fired in the oxidizing atmosphere after firing in the reducing atmosphere, the oxygen deficiencies in the crystal structure of the phosphor are reduced, and areas of amorphous structures are also reduced. As a result, even when irradiation of ultraviolet rays or ion impact exists, deterioration of the crystal structure is reduced, and deterioration of brightness is also reduced.

According to the present embodiment, BAM base and $Eu^{2+}$ as an activator are discussed. However, another material (e.g., $CaMgSi_2O_6$:Eu using $Eu^{2+}$ as an activator or a green phosphor (Ba, Sr, Mg) $O.aAl_2O_3$:Mn where an oxide using $Mn^{2+}$ as an activator is a host crystal) has also high brightness of emission and effect to restrict deterioration of brightness by firing in the oxidizing atmosphere.

INDUSTRIAL APPLICABILITY

According to the present invention discussed above, even in a phosphor whose host crystal is an oxide and Eu or Mn of an emission center is required to be activated at divalence, oxygen deficiencies can be repaired without deterioration of emission brightness. Therefore, the phosphor is useful for improving performance of a display device (e.g., a plasma display device) or an illuminator (e.g., a rare gas discharge lump or a high load fluorescent lamp).

The invention claimed is:
1. A plasma display device comprising:
   a plurality of discharge cells arranged to show a single color or multiple colors; and
   phosphor layers arranged such that colors of the phosphor layers correspond to the colors of the discharge cells, and being arranged to be excited by ultraviolet rays for emitting light,
   wherein a composition formula of at least one phosphor layer of the phosphor layers is $Ba_{(1-x-y)}Sr_yMgAl_{10}O_{17}$:$Eu_x$,
   wherein x has a value such that $0.01 \leq x \leq 0.20$, and y has a value such that $0.1 \leq y \leq 0.30$, and wherein the at least one phosphor layer is formed of a phosphor which has been fired in atmospheric air at a temperature ranging from 800° C. to 1500° C., fired in a reducing atmosphere at a temperature ranging from 1100° C. to 1500° C., and fired in an oxidizing atmosphere at a temperature ranging from 600° C. to 1000° C.

* * * * *